US012584379B2

(12) United States Patent
Han

(10) Patent No.: US 12,584,379 B2
(45) Date of Patent: Mar. 24, 2026

(54) SYSTEMS AND METHODS FOR NOTCHING A TARGET WELLBORE IN A SUBSURFACE FORMATION

(71) Applicant: Saudi Arabian Oil Company, Dhahran (SA)

(72) Inventor: Yanhui Han, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 972 days.

(21) Appl. No.: 17/826,393

(22) Filed: May 27, 2022

(65) Prior Publication Data

US 2023/0383622 A1      Nov. 30, 2023

(51) Int. Cl.
*G01V 20/00* (2024.01)
*E21B 41/00* (2006.01)
*G06F 30/20* (2020.01)
*G06F 113/08* (2020.01)

(52) U.S. Cl.
CPC .............. *E21B 41/00* (2013.01); *G01V 20/00* (2024.01); *G06F 30/20* (2020.01); *E21B 2200/20* (2020.05); *G06F 2113/08* (2020.01)

(58) Field of Classification Search
CPC ...... E21B 41/00; E21B 2200/20; E21B 29/00; E21B 43/26; G01V 20/00; G06F 30/20; G06F 2113/08
USPC ............................................. 703/10.2, 10, 2
See application file for complete search history.

(56) References Cited

U.S. PATENT DOCUMENTS

| | | | |
|---|---|---|---|
| 10,526,890 B2 | 1/2020 | Batmaz et al. | |
| 2018/0266183 A1 | 9/2018 | Ayub | |
| 2018/0320484 A1 | 11/2018 | Gordeliy et al. | |
| 2023/0193752 A1* | 6/2023 | Han ........................ | E21B 43/27 |
| | | | 166/250.1 |

OTHER PUBLICATIONS

Schwartzkopff et al., "Breakdown pressure and propagation surface of a hydraulically pressurized circular notch within a rock material", 2021, Rock Mechanics and Rock Engineering 54.1, pp. 191-218.*

* cited by examiner

*Primary Examiner* — Juan C Ochoa
(74) *Attorney, Agent, or Firm* — DINSMORE & SHOHL LLP

(57) ABSTRACT

A system for notching a target wellbore in a subsurface formation includes a notching tool and a wellbore modelling system in communication with the notching tool. The wellbore modelling system includes a simulated notch, a simulated wellbore, a computational mesh, and a data processor. The simulated notch and the simulated wellbore are digitally positioned in the computational mesh of the wellbore modelling system. The simulated notch extends from the simulated wellbore. The data processor is communicatively coupled to the simulated notch, the simulated wellbore, and the computational mesh, and is operable to execute an iterative process. The wellbore modelling system is configured to communicate the target notch shape, the target cutting depth, or both, to the notching tool for notching the target wellbore with the target notch shape, the target cutting depth, or both.

20 Claims, 8 Drawing Sheets

SYSTEMS AND METHODS FOR NOTCHING A TARGET WELLBORE IN A SUBSURFACE FORMATION

TECHNICAL FIELD

Embodiments described herein generally relate to subsurface formation notching tools, wellbore modelling systems, and methods for applying, and more specifically, to systems and methods for notching a target wellbore.

BACKGROUND

In oil and gas drilling, wellbore stimulation is a common treatment performed in subsurface formations to enhance or restore the productivity of oil and gas from a hydrocarbon-containing well and associated wellbore. Hydraulic fracturing may be one method of wellbore stimulation. In hydraulic fracturing, pressure in the wellbore is increased by injecting a fluid until a conductive fracture is created that helps enhance the production of oil and gas from the subsurface formation.

SUMMARY

A conductive fracture is created when the injected pressure exceeds the local minimum confining (tangential) stress on the wellbore wall plus the tensile strength of the reservoir rock. This threshold pressure can be referred to as the breakdown pressure. The conductive fracture is generally created orthogonally to the direction of the least resistance or minimum confining stress. The breakdown pressure is generally much higher than the minimum confining stress plus the tensile strength of the reservoir rock, owing to the stress concentration around the wellbore. Ideally, breakdown pressure would be reduced to approach the minimum confining stress plus tensile strength. Accordingly, methods for reducing the breakdown pressure to approach the minimum confining stress plus tensile strength are needed.

Breakdown pressure can be reduced by generating a notch around the wellbore. Notches reduce breakdown pressure by redistributing the stress concentration around the notch. The present inventors have recognized a continuing need to predict how much various notching configurations can help reduce the breakdown pressure.

The present inventor has recognized three challenges associated with traditional methods of predicting how notching configurations can affect breakdown pressure. First, some methods are reactive in that they require drilling multiple wells with various notching configurations to find a preferred notching configuration. Second, subsurface formations may be heterogeneous with different confining stresses and rock tensile strengths in different locations. Third, the methodology of the first case may not result in a truly optimized notch configuration for the target wellbore.

Therefore, the present inventor has recognized a need for methods and systems that can more accurately quantify the effectiveness of various notching configurations by how they reduce breakdown pressure in a target wellbore.

The present disclosure addresses this need by providing systems and methods that allow for quantifying the effect that notch depth and notch shape have on the breakdown pressure of a target wellbore in a subsurface formation. The systems and methods accomplish this utilizing a wellbore modelling system and a notching tool in communication with each other. The wellbore modelling system includes a simulated notch, a simulated wellbore, a computational mesh and a data processor. The computational mesh includes confining stresses and mechanical rock properties that represent the subsurface formation and downhole environment. The data processor is operable to execute an iterative process including at least a fluid injection simulation for the computational mesh that may model increasing wellbore pressure introduced by fluid injection in hydraulic fracturing. The iterative process may also result in an optimization of the effect that the target cutting depth, the notch shape, or both, have on the adjustment of breakdown pressure approaching the minimum confining stress plus rock tensile strength.

In accordance with one embodiment of the present disclosure, a system for notching a target wellbore in a subsurface formation includes a notching tool and a wellbore modelling system in communication with the notching tool. The wellbore modelling system includes a simulated notch, a simulated wellbore, a computational mesh, and a data processor. The computational mesh includes global in-situ stresses, an internal stress distribution and a rock tensile strength distribution that represents the subsurface formation. The simulated notch and the simulated wellbore are digitally positioned in the computational mesh of the wellbore modelling system. The simulated notch extends from the simulated wellbore. The data processor is communicatively coupled to the simulated notch, the simulated wellbore, and the computational mesh, and is operable to execute an iterative process. The wellbore modelling system is configured to communicate the target notch shape, the target cutting depth, or both, to the notching tool for notching the target wellbore with the target notch shape, the target cutting depth, or both.

The iterative process includes determining a minimum confining stress of the computational mesh based on the global in-situ stresses, redistributing the internal stress distribution of the computational mesh based on a digital positioning of the simulated notch, generating a fluid injection simulation for the computational mesh including the simulated notch and the simulated wellbore, the fluid injection simulation including a ramp-type pressure increase of wellbore pressure on a computational mesh-facing surface of the simulated wellbore and the simulated notch, the ramp-type pressure increase configured to model increasing wellbore pressure introduced by fluid injection in hydraulic fracturing, monitoring a kinetic energy of the fluid injection simulation based on the ramp-type pressure increase, predicting a breakdown pressure inside the computational mesh by identifying a spike in the monitored kinetic energy, adjusting a target notch shape of the simulated notch, a target cutting depth of the simulated notch, or both, to predict an adjusted breakdown pressure inside the computational mesh when a difference between the predicted breakdown pressure and the minimum confining stress plus the rock tensile strength is greater than a target pressure delta, continuing the iterative process to predict the adjusted breakdown pressure inside the computational mesh until the difference between the predicted breakdown pressure and the minimum confining stress plus the rock tensile strength is less than or equal to the target pressure delta, and identifying the target notch shape, the target cutting depth, or both, associated with the iteratively adjusted breakdown pressure.

In accordance with another embodiment of the present disclosure, a system for notching a target wellbore in a subsurface formation includes a notching tool and a wellbore modelling system in communication with the notching tool. The wellbore modelling system includes a simulated notch, a simulated wellbore, a computational mesh, and a data processor. The simulated notch and the simulated wellbore are digitally positioned in the computational mesh of the wellbore modelling system. The simulated notch extends from the simulated wellbore. The data processor is communicatively coupled to the simulated notch, the simulated wellbore, and the computational mesh, and is operable to execute an iterative process. The wellbore modelling system is configured to communicate the target notch shape, the target cutting depth, or both, to the notching tool for notching the target wellbore with the target notch shape, the target cutting depth, or both.

The iterative process includes redistributing the internal stress distribution of the computational mesh based on a digital positioning of the simulated notch, generating a fluid injection simulation for the computational mesh including the simulated notch and the simulated wellbore, predicting a breakdown pressure inside the computational mesh by identifying a spike in the monitored kinetic energy, adjusting a target notch shape of the simulated notch, a target cutting depth of the simulated notch, or both, to predict an adjusted breakdown pressure inside the computational mesh, continuing the iterative process to predict the adjusted breakdown pressure inside the computational mesh until the difference between the predicted breakdown pressure and the minimum confining stress plus the rock tensile strength is less than or equal to the target pressure delta, and identifying the target notch shape, the target cutting depth, or both, associated with the iteratively adjusted breakdown pressure.

In accordance with another embodiment of the present disclosure, a method for notching a target wellbore in a subsurface formation utilizing a notching tool and a wellbore modelling system in communication with the notching tool includes the wellbore modelling system including a simulated notch, a simulated wellbore, a computational mesh, and a data processor; the computational mesh including global in-situ stresses, an internal stress distribution and a rock tensile strength distribution that represent the subsurface formation; the simulated notch and the simulated wellbore being digitally positioned in the computational mesh of the wellbore modelling system; the simulated notch extending from the simulated wellbore; and the data processor being communicatively coupled to the simulated notch, the simulated wellbore, and the computational mesh.

The method includes executing an iterative process including determining a minimum confining stress of the computational mesh based on the global in-situ stresses, redistributing the internal stress distribution of the computational mesh based on a digital positioning of the simulated notch, generating a fluid injection simulation for the computational mesh including the simulated notch and the simulated wellbore, the fluid injection simulation including a ramp-type pressure increase of wellbore pressure on a computational mesh-facing surface of the simulated wellbore and the simulated notch, monitoring a kinetic energy of the fluid injection simulation based on the ramp-type pressure increase, predicting a breakdown pressure inside the computational mesh by identifying a spike in the monitored kinetic energy, and adjusting a target notch shape of the simulated notch, a target cutting depth of the simulated notch, or both, to predict an adjusted breakdown pressure inside the computational mesh when a difference between the predicted breakdown pressure and the minimum confining stress plus the rock tensile strength is greater than a target pressure delta.

The method further includes continuing the iterative process to predict the adjusted breakdown pressure inside the computational mesh until the difference between the predicted breakdown pressure and the minimum confining stress plus the rock tensile strength is less than or equal to the target pressure delta, identifying the target notch shape, the target cutting depth, or both, associated with the iteratively adjusted breakdown pressure, communicating the target notch shape, the target cutting depth, or both, to the notching tool, and notching the target wellbore with the target notch shape, the target cutting depth, or both.

Additional features and advantages of the described embodiments will be set forth in the detailed description, which follows, and in part will be readily apparent to those skilled in the art from that description or recognized by practicing the described embodiments, including the detailed description, which follows, as well as the claims.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to a system for notching a target wellbore in a subsurface formation and methods for notching a target wellbore in a subsurface formation.

As used throughout this disclosure, the terms "downhole" and "uphole" may refer to a position within a wellbore relative to the surface, with uphole indicating direction or position closer to the surface and downhole referring to direction or position farther away from the surface.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

Figure 1:
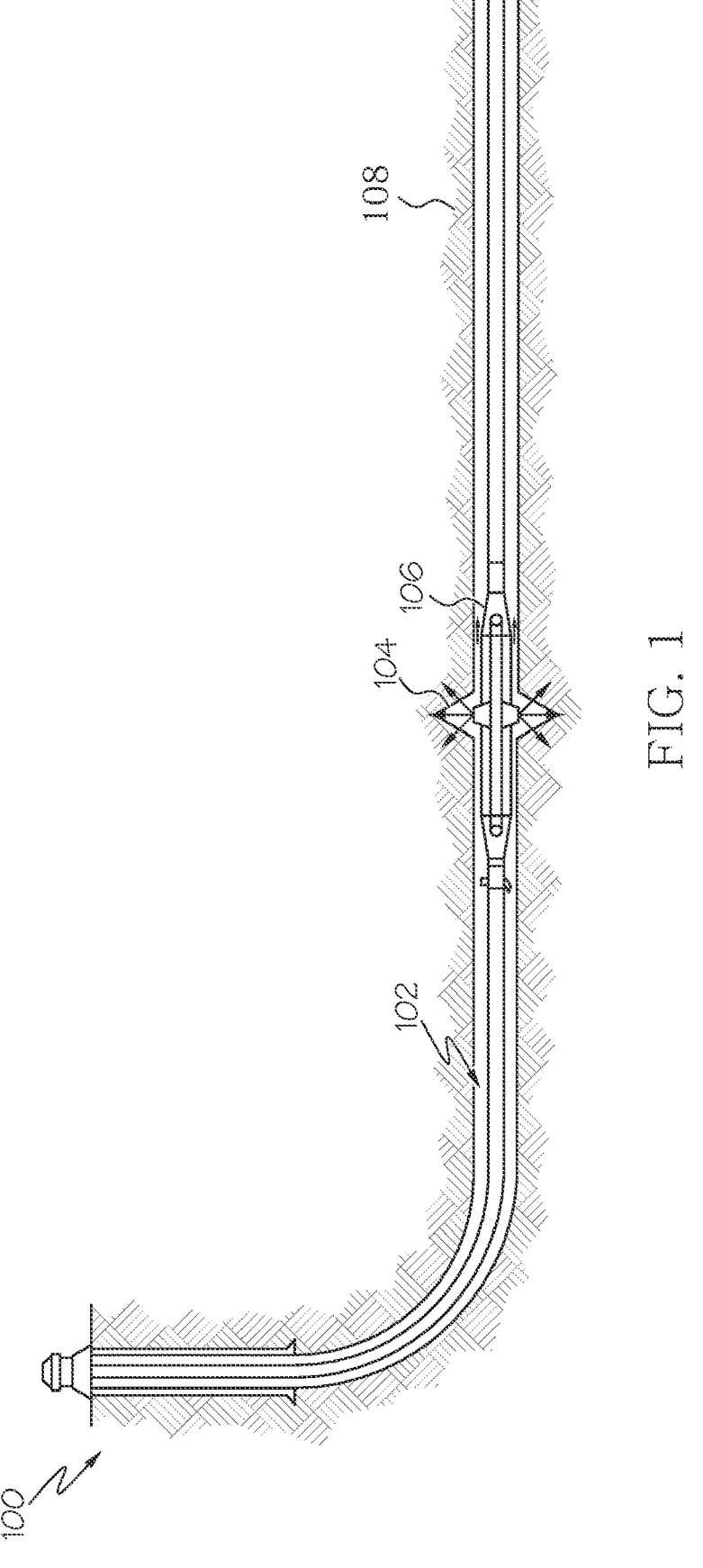
FIG. 1 is an illustrative drawing of a notching tool in a target wellbore according to one or more embodiments herein.

Referring initially to FIG. 1, a wellbore schematic 100 is illustrated. The wellbore schematic 100 includes a target wellbore 102, a notch 104, a notching tool 106, and subsurface formation 108. In embodiments, the notching tool 106 may notch the target wellbore 102, thereby creating the notch 104 in the subsurface formation 108. The notching tool 106 may include a mechanical notching tool, a hydraulic notching tool, a laser notching tool, or a thermal notching tool.

In embodiments, the mechanical notching tool may notch the target wellbore 102 and the subsurface formation 108 by the mechanical notching tool extending cutters from within the mechanical notching tool. The cutters may be capable of milling parts of the subsurface formation 108 immediately contacting the cutters. In embodiments, the hydraulic notching tool may notch the target wellbore 102 and the subsurface formation 108 by spraying a fluid against the wellbore wall of the target wellbore 102 from a hydraulic nozzle that may be part of the hydraulic notching tool. The fluid may be sprayed at force and rate sufficient to erode parts of the subsurface formation 108 contacted by the sprayed fluid.

In embodiments, the laser notching tool may notch the target wellbore 102 and the subsurface formation 108 by extending a laser towards the wellbore wall of the target wellbore 102. The laser may be capable of removing parts of the subsurface formation immediately in the path of the laser beam. In embodiments, the thermal notching tool may notch the target wellbore 102 by exposing a wellbore wall of the target wellbore 102 to thermal energy emitted from the thermal notching tool. In embodiments, the thermal notching tool may not remove subsurface formation 108 similar to the other notching tools. It is contemplated that the thermal energy may be capable of permanently dehydrating an area of the subsurface formation 108, thereby creating a notched dehydrated section that may be weaker than the surrounding subsurface formation 108. It is also contemplated that this dehydrated section may become a weaker breakdown spot in subsequent fracturing operations.

Figure 2:
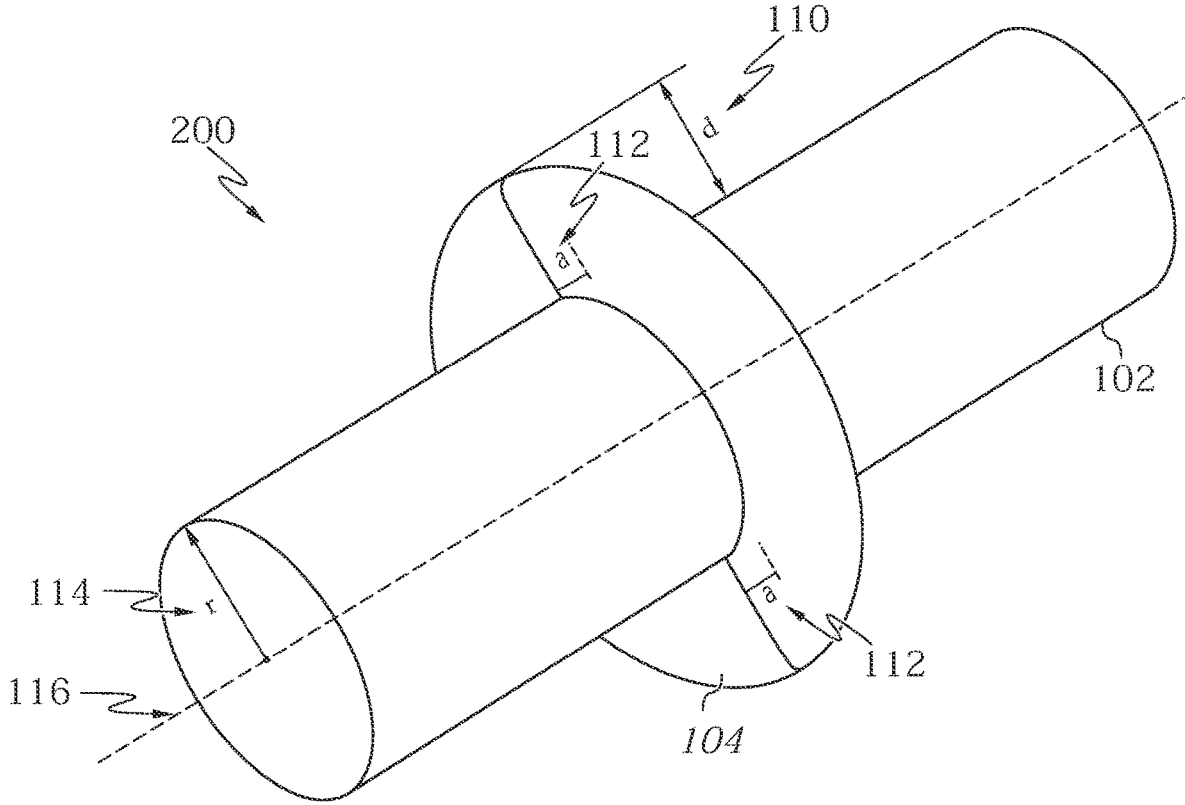
FIG. 2 is an isometric view of a notch according to one or more embodiments herein.

Now referring to FIG. 2, an isometric view 200 of the notch 104 according to embodiments herein is illustrated. In embodiments, the notch 104 may include a cutting depth 110, designated by "d," and an aperture 112, designated by "a." The cutting depth 110 may be measured orthogonal to an exterior surface of the target wellbore 102. The aperture 112 may be measured as the width of the opening of the notch 104.

Now referring to FIGS. 1 and 2, in embodiments, the notch 104 may be defined with reference to the target wellbore 102. The target wellbore 102 may include a radius 114, designated by "r," and an target wellbore axis 116. The notch 104 may be triangular (as shown in FIG. 1) or circular (as shown in FIG. 2). Notches, according to embodiments herein, may also be (not shown) frusto-circular, elliptical, frusto-elliptical, polygonal, or any other suitable shape. As illustrated in FIG. 2, the notch 104 may be a transverse notch orientated about, or perpendicular to the target wellbore's axis 116. However, in embodiments, the notch 104 may alternatively be a longitudinal notch orientated along the target wellbore's axis 116 (not shown).

Figure 3:
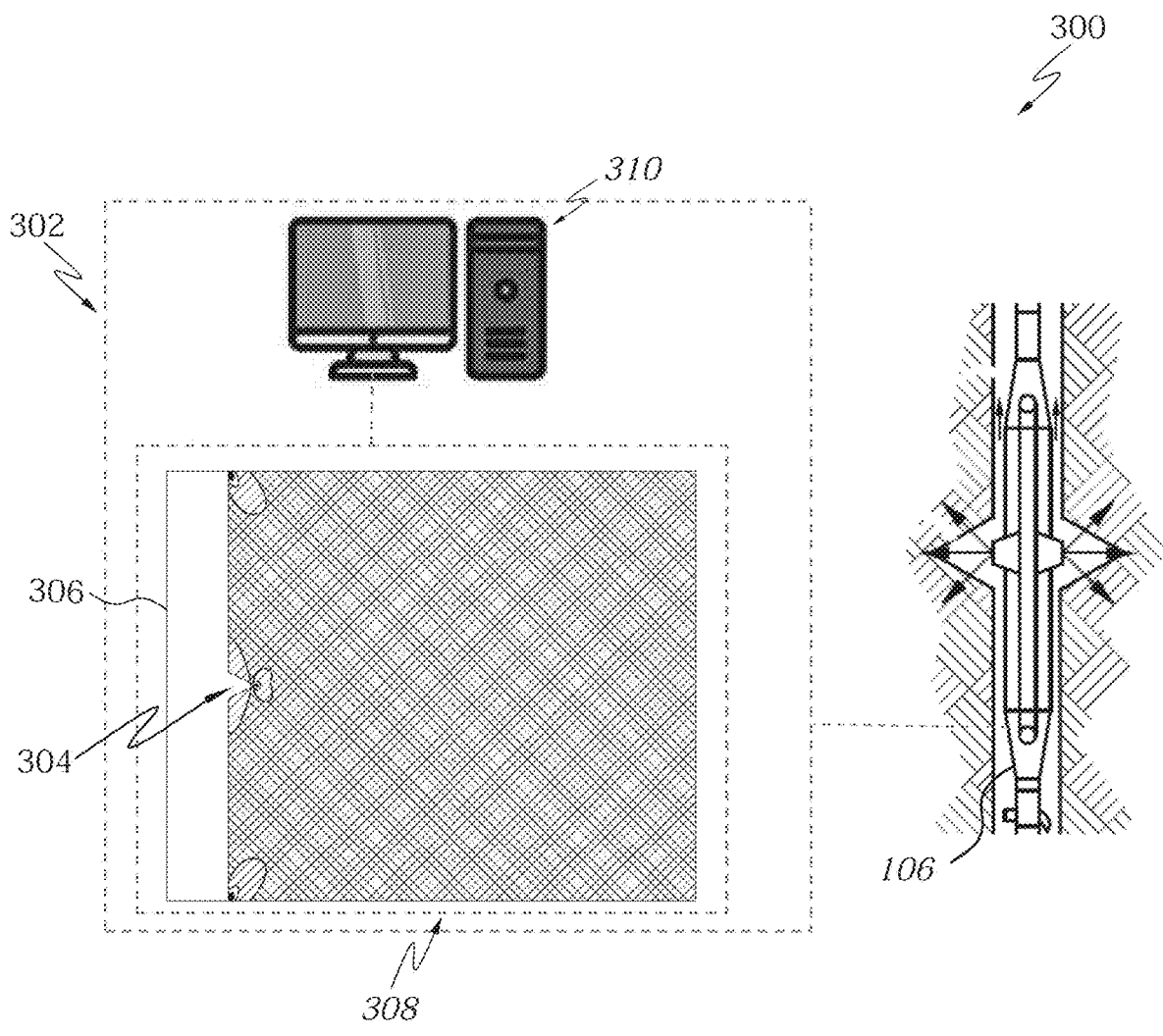
FIG. 3 is an illustrative drawing of a system for notching a target wellbore in a subsurface formation according to one or more embodiments herein.

Now referring to FIG. 3, a system 300 for notching a target wellbore 102 in a subsurface formation is illustrated. The system 300 includes a notching tool 106 and a wellbore modelling system 302 in communication with the notching tool 106. The wellbore modelling system 302 includes a simulated notch 304, a simulated wellbore 306, a computational mesh 308 (a simulated near-wellbore formation or rock mass), and a data processor 310.

Now referring to FIGS. 1-3, and in embodiments, the simulated notch 304 may include a target cutting depth, a target notch shape, or both. The target cutting depth of the simulated notch 304 may be measured orthogonally from the simulated wellbore 306. The simulated wellbore 306 may include a radius (not labeled) that may be the same as the radius 114, such that the simulated wellbore 306 may have the same dimensions as the target wellbore 102. The target cutting depth of the simulated notch 304 may be made to represent the cutting depth 110 of the notch 104. The target notch shape may be made to represent the shape of the notch 104. In one non-limiting example, in this manner, the simulated notch 304 and the simulated wellbore 306 may be made to represent the notch 104 in the target wellbore 102. As previously discussed, the notch 104 may be a transverse notch or a longitudinal notch. Similarly, the simulated notch 304 may be a transverse simulated notch or a longitudinal simulated notch that represents the transverse notch or the longitudinal notch, respectively.

Figure 4A:
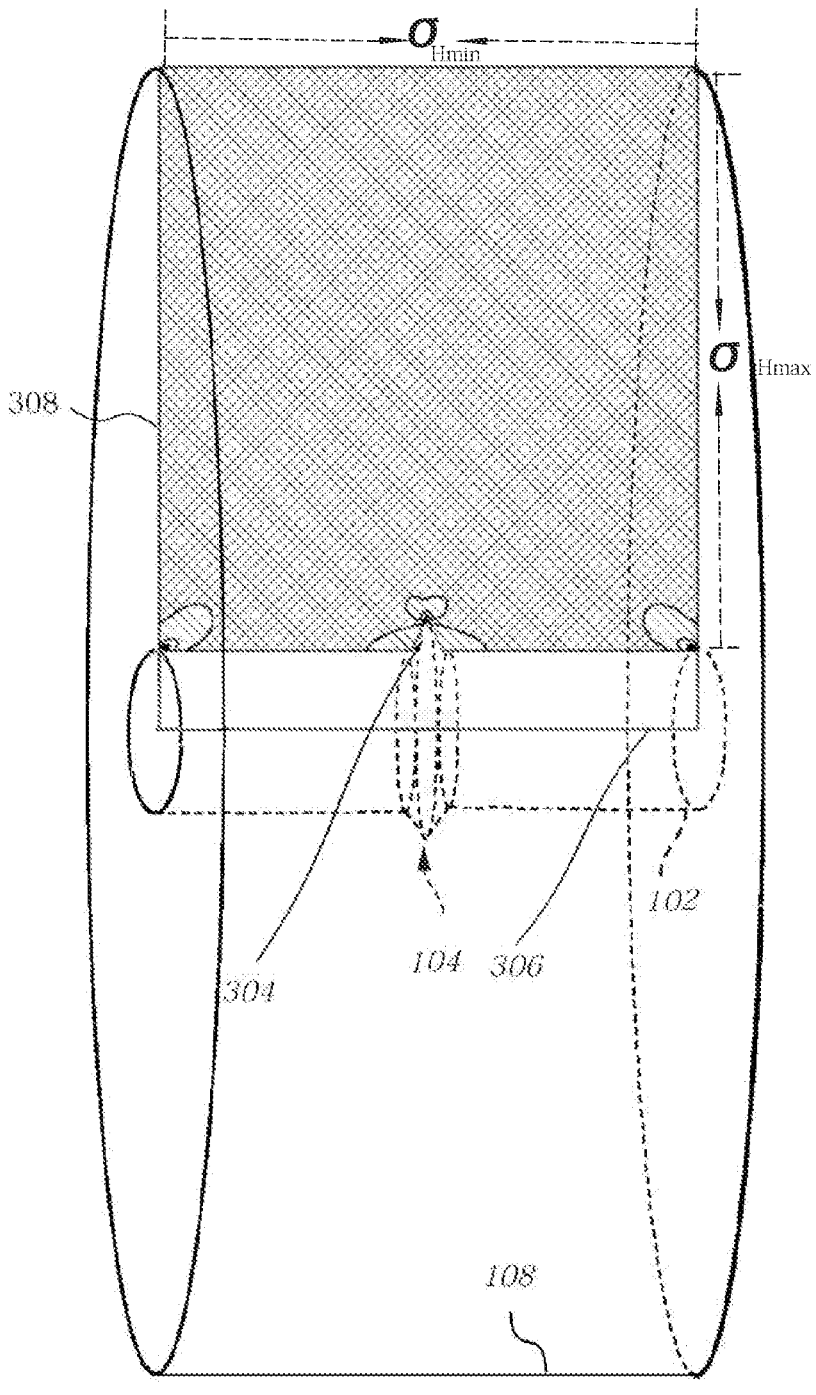
FIG. 4A is an illustrative drawing of a computational mesh and target wellbore according to one or more embodiments herein.
Figure 4B:
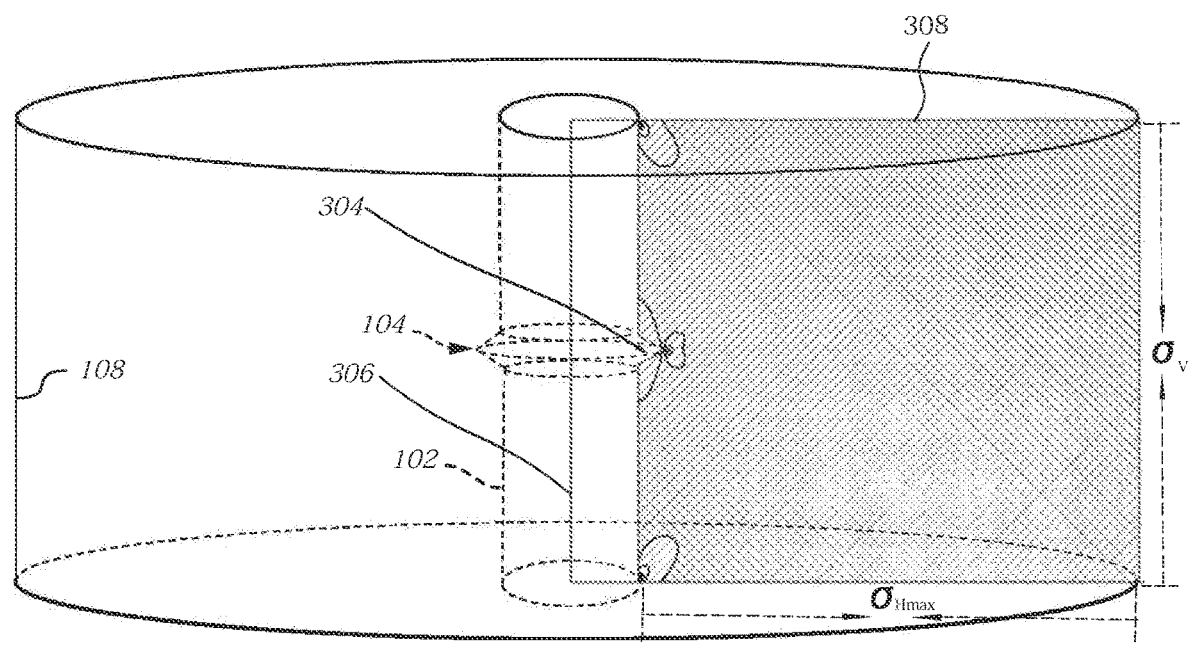
FIG. 4B is an illustrative drawing of a computational mesh and target wellbore according to one or more embodiments herein.
Figure 4C:
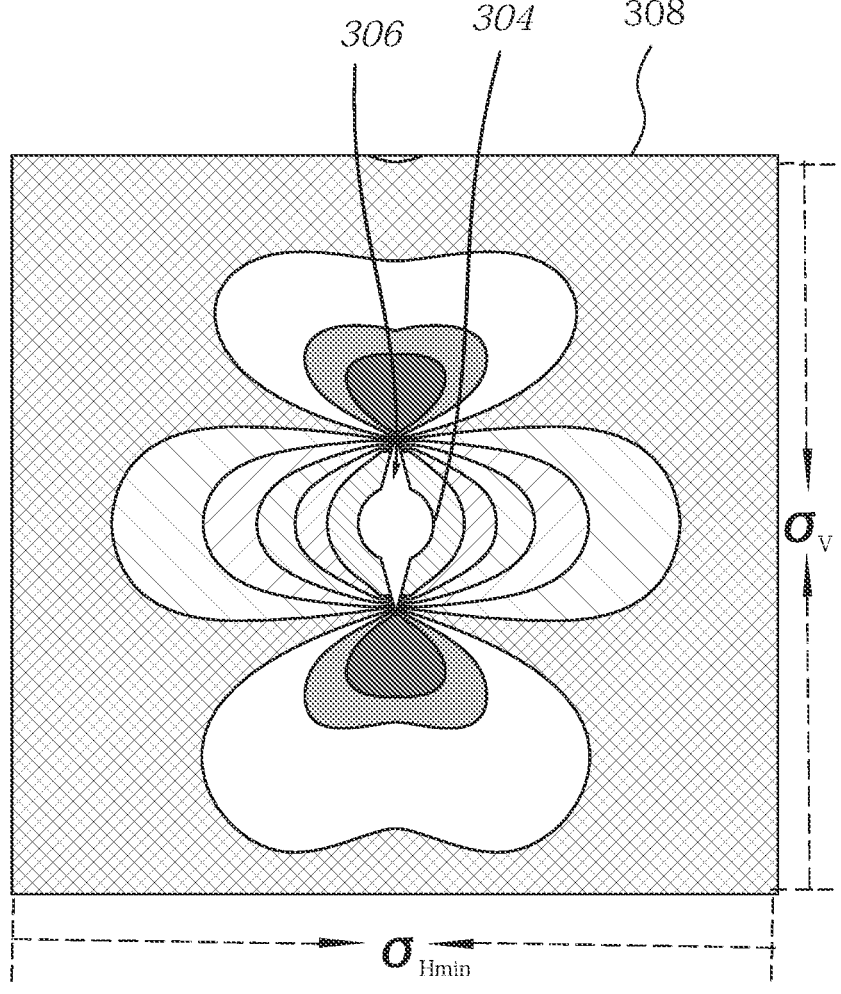
FIG. 4C is an illustrative drawing of a computational mesh according to one or more embodiments herein.

Now referring to FIGS. 4A, 4B, and 4C, three illustrations of computational mesh 308 of the wellbore modeling system 302, according to embodiments herein, are illustrated. FIG. 4A represents the wellbore modeling system 302 for notching the target wellbore 102 in a horizontally drilled wellbore with a transverse notch. FIG. 4B represents the wellbore modeling system 302 for notching the target wellbore 102 in a vertically drilled wellbore with a transverse notch. FIG. 4C represents another wellbore modeling system 302 for notching the target wellbore 102 in the horizontally drilled wellbore with a longitudinal notch.

Referring again to FIGS. 3, 4A, and 4B, the simulated notch 304 and the simulated wellbore 306 are digitally positioned in the computational mesh 308 of the wellbore modelling system 302. In embodiments, the simulated notch 304 may extend from the simulated wellbore 306 similar to the notch 104 extending from the target wellbore 102. In embodiments, the previously described digital positioning may allow the combination of the simulated notch 304, the simulated wellbore 306, and the computational mesh 308 to model the notch 104, the target wellbore 102, and the subsurface formation 108.

Referring again to FIGS. 3, 4A, 4B, and 4C, and in embodiments, the computational mesh 308 of FIG. 3 may be identical to the computational mesh 308 of FIG. 4A, 4B, or 4C. The computational mesh 308 may include global in-situ stresses, internal stress distributions and rock tensile strength distributions that represent the subsurface formation. The computational mesh 308 may further include mechanical rock properties. The mechanical rock properties may include density, Young's modulus, Poisson's ratio, cohesion, friction angle, pore pressure, or combinations thereof. In embodiments, and as previously described, the computational mesh 308 may represent the geological formation around the wellbore. In embodiments, the confining stress distribution, rock tensile strength, and mechanical rock properties may represent far-field stress conditions, downhole conditions (such as downhole pressure) and the mechanical properties and states of the subsurface formation 108.

In embodiments, the global in-situ stresses of the computational mesh 308 may include at least two of a minimum horizontal stress "$\sigma_{Hmin}$", a maximum horizontal stress "$\sigma_{Hmax}$", and a vertical stress "$\sigma_V$". The global in-situ stresses may act on the boundaries of the computational mesh 308. The global in-situ stresses may also include an axial stress "$\sigma_a$" that acts in the simulated wellbore's axial direction, i.e., along the simulated wellbore's axis. In embodiments, the axial stress may be any of the minimum horizontal stress, the maximum horizontal stress, or the vertical stress, depending on the orientation of the target wellbore 102. For example, and as illustrated in FIG. 4A, the horizontally drilled wellbore may include the minimum horizontal stress and the maximum horizontal stress. The horizontally drilled wellbore of FIG. 4A was drilled in the axial direction of the minimum horizontal stress, so axial stress equals the minimum horizontal stress. If the horizontally drilled target wellbore of FIG. 4A was drilled in the axial direction of the maximum horizontal stress, the axial stress would equal the maximum horizontal stress. In embodiments, and as illustrated by FIG. 4B, the vertically drilled wellbore may include the minimum horizontal stress and the vertical stress. The vertically drilled wellbore of FIG. 4B was drilled in the axial direction of the vertical stress, so axial stress equals the vertical stress.

Still referring to FIGS. 4A, 4B, and 4C, and in embodiments, the lesser of the global in-situ stresses of the computational mesh 308 may be a minimum confining stress of the computational mesh 308. The greater of the global in-situ stresses of the computational mesh 308 may be a maximum confining stress of the computational mesh 308. These are expressed herein as $\sigma_{min}$ and $\sigma_{max}$, respectively. In embodiments, $\sigma_{min}$ and $\sigma_{max}$ may be representative of the confining stresses acting on the simulated wellbore 304 and simulated notch 306 of the computational mesh 308. The minimum confining stress may be any of the minimum horizontal stress, the maximum horizontal stress, or the vertical stress. The maximum confining stress may also be any of the same. In embodiments, the simulated notch 304 is digitally positioned and extends orthogonally to the minimum confining stress and parallel to the maximum confining stress.

In one non-limiting example, and as illustrated in FIG. 4A, for the horizontally drilled wellbore, the two global in-situ stresses represented in the computational mesh 308 may include the minimum horizontal stress and the maximum horizontal stress. In embodiments, the simulated notch 304 may be placed and extend orthogonally to the minimum horizontal stress, which may be the minimum confining stress, and parallel to the maximum horizontal stress, which may be the maximum confining stress. The simulated notch

304 in this scenario may be a transverse simulated notch, as it is oriented about, or perpendicular to, the target wellbore 102's axis 116, as shown by FIGS. 2 and 4A.

In another non-limiting example, and as illustrated in FIG. 4B, for the vertically drilled wellbore, the two global in-situ stresses represented in the computational mesh 308 may include the maximum horizontal stress and the vertical stress. In embodiments, the simulated notch 304 may be placed and extend orthogonally to the vertical stress, which may be the minimum confining stress, and parallel to the maximum horizontal stress, which may be the maximum confining stress. The simulated notch 304 in this scenario may be a transverse simulated notch, as it is orientated perpendicular to the target wellbore 102's axis 116, as shown by FIGS. 2 and 4B.

In another non-limiting example, and as meant to be shown by FIGS. 4C, for the horizontally drilled wellbore the two global in-situ stresses represented in the computational mesh 308 may include the minimum horizontal stress and the vertical stress. In embodiments, the simulated notch 304 may be placed and extend orthogonally to the minimum horizontal stress, which may be the minimum confining stress, and parallel to the vertical stress, which may be the maximum confining stress. The simulated notch 304 in this scenario may be a longitudinal simulated notch, as it is orientated along the target wellbore 102's axis.

As will be understood in the art, FIG. 4C could also be slightly altered to represent a computational mesh 308 for a vertically drilled wellbore similar to that illustrated in FIG. 4B. In this case, the two global in-situ stresses represented in the computational mesh 308 would include the minimum horizontal stress and the maximum horizontal stress. The simulated notch 304 would then be placed and extend orthogonally to the minimum horizontal stress, which would be the minimum confining stress, and parallel to the maximum horizontal stress, which would be the maximum confining stress. The simulated notch 304 in this scenario would be a longitudinal simulated notch, as it would be orientated along the target wellbore 102's axis.

As will also be understood in the art, wellbores may be formed (drilled) in an orientation angled somewhere between a vertical wellbore and a horizontal wellbore, i.e. the wellbores may be drilled directionally somewhere between true vertical and true horizontal with a specified wellbore inclination and azimuth. In directionally drilled wellbores, $\sigma_{min}$ and $\sigma_{max}$ may not correspond exactly to the confining stresses acting on the target wellbore 102, as well as the simulated wellbore 304, simulated notch 306, and the computational mesh 308. However, as will also be understood in the art, $\sigma_{min}$ and $\sigma_{max}$ may be subjected to a transform based on the wellbore inclination and azimuth to transform them into the confining stresses acting on the target wellbore 102 as well as the simulated wellbore 304 and simulated notch 306 of the computational mesh 308, i.e., $\sigma_{min}$ and $\sigma_{max}$ may be transformed into $\sigma_{min}'$ and $\sigma_{max}'$. In this case, $\sigma_{min}'$ and $\sigma_{max}'$ would be used in the systems and methods discussed herein instead of $\sigma_{min}$ and $\sigma_{max}$ for a directionally drilled wellbore.

In embodiments, and as illustrated in FIGS. 4A and 4B, the previously described digital positioning of the simulated notch 304 and simulated wellbore 306 may be axisymmetric to the target wellbore 102, the notch 104, and the subsurface formation 108. It is contemplated that, because of the axisymmetric configuration, this may allow the wellbore modeling system 302 to model the transverse notching of the target wellbore 102 in the subsurface formation 108 in simplified two-dimensional equations that can then be used in three-dimensional applications. It is also contemplated that the simplified two-dimensional equations may reduce the computation time of the model as compared to equivalent three-dimensional equations. In embodiments, the axisymmetric configuration may model the vertically drilled target wellbore 102 of FIG. 4B when the maximum and minimum horizontal stresses are equal. The axisymmetric configuration may model the horizontally drilled target wellbore 102 of FIG. 4A when the maximum horizontal stress and the vertical stress are equal.

Referring again to FIGS. 4A, 4B, and 4C, and in embodiments, the contours on the computational mesh 308 may correspond to non-uniform distributions of internal stresses in the computational mesh 308. In embodiments, the non-uniform distributions of internal stresses in the computational mesh 308 may be induced by the global in-situ stresses acting on the boundaries of the computational mesh 308. In embodiments, the non-uniform distributions of internal stresses may be affected by the target cutting depth and the target notch shape of the simulated notch 304. The non-uniform distributions of internal stresses may also be affected by the dimensions of the simulated wellbore 306. The non-uniform distributions of internal stresses may also be affected by wellbore fluid pressure and the mechanical rock properties.

Referring again to FIGS. 3, 4A, and 4B, the data processor 310 is communicatively coupled to the simulated notch 304, the simulated wellbore 306, and the computational mesh 308, which again may represent the subsurface formation. The data processor 310 is also operable to execute an iterative process including determining a minimum confining stress of the computational mesh based on the global in-situ stresses, redistributing the internal stress distribution of the computational mesh 308 based on the simulated notch 304; generating a fluid injection simulation for the computational mesh 308 including the simulated notch 304 and the simulated wellbore 306; predicting a breakdown pressure inside the computational mesh 308 by identifying a spike in a monitored kinetic energy of the fluid injection simulation; adjusting a target notch shape of the simulated notch 304, a target cutting depth of the simulated notch 304, or both, to predict an adjusted breakdown pressure inside the computational mesh 308 when a difference between the predicted breakdown pressure and the minimum confining stress plus the rock tensile strength; continuing the iterative process to predict the adjusted breakdown pressure inside the computational mesh 308 until a difference between the predicted breakdown pressure and the minimum confining stress plus the rock tensile strength is less than or equal to a target pressure delta; and identifying the target notch shape, the target cutting depth, or both, associated with the iteratively adjusted breakdown pressure.

Still referring to FIGS. 3, 4A, and 4B, and in embodiments, the target pressure delta may represent an accepted optimization of the effect a current target cutting depth, a current target notch shape, or both, have on the breakdown pressure approaching the minimum confining stress plus rock tensile strength. In embodiments, the target notch shape of the simulated notch 304, the target cutting depth of the simulated notch 304, or both may be adjusted to adjust breakdown pressure when the difference between the predicted breakdown pressure and the minimum confining stress plus rock tensile strength is greater than the target pressure delta.

In embodiments, the target pressure delta may be less than or equal to two percent of the minimum confining stress plus rock tensile strength. The target pressure delta may be less than or equal to five percent of the minimum confining stress plus rock tensile strength. In embodiments, the target pressure delta may be any number between zero and five percent of the minimum confining stress plus rock tensile strength.

Still referring to FIGS. 3, 4A, and 4B, and in embodiments, the fluid injection simulation may include a ramp-type pressure increase of wellbore pressure on a computational mesh-facing surface of the simulated wellbore 306 and the simulated notch 304. The ramp-type pressure increase may be configured to model increasing wellbore pressure introduced by fluid injection in hydraulic fracturing. The iterative process may further include monitoring the kinetic energy of the fluid injection simulation based on the ramp-type pressure increase.

Figure 6:
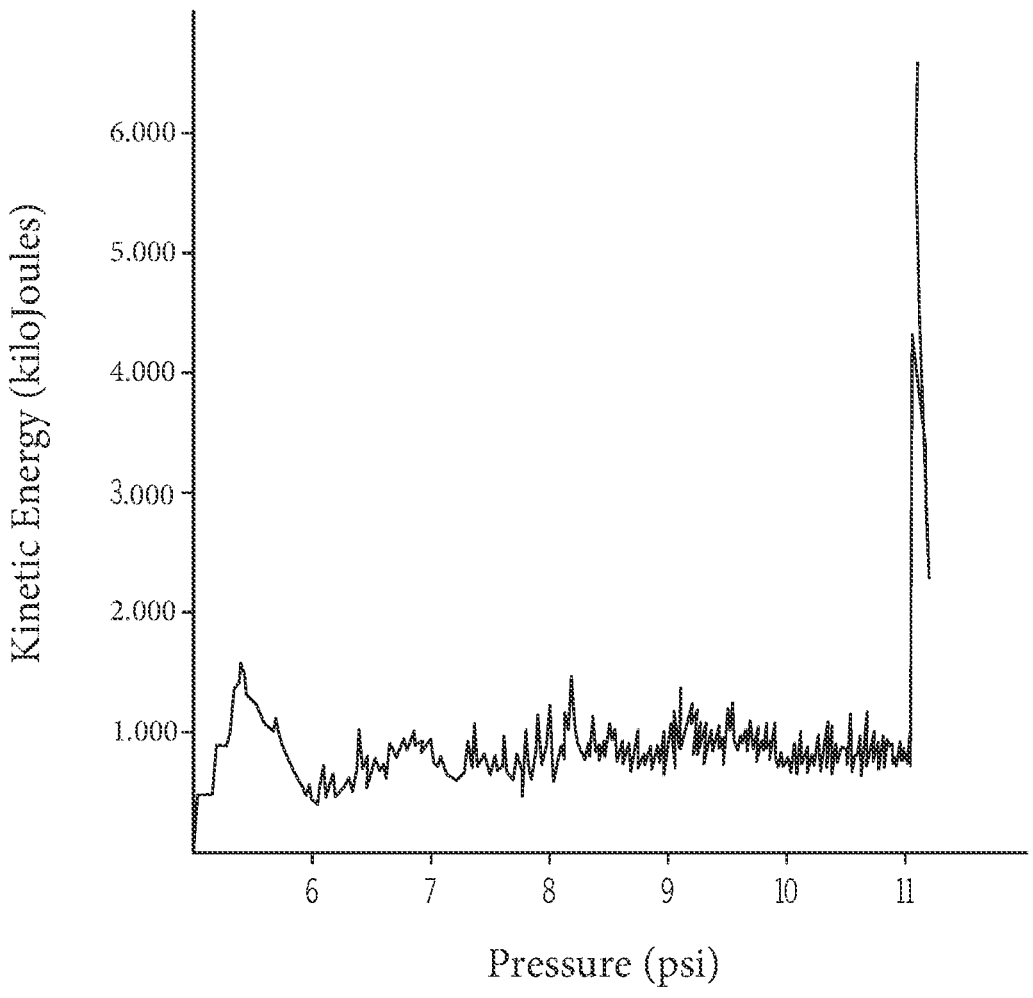
FIG. 6 graphically illustrates a kinetic energy spike and the relationship between kinetic energy and pressure during a fluid injection simulation, according to one or more embodiments herein.

Now referring to FIG. 6, an illustration of a "kinetic energy spike" or "spike" during a fluid injection simulation, according to embodiments herein, is shown. Now referring to FIGS. 3 and 6, and in embodiments, the pressure at which the kinetic energy spike occurs may be the subsurface formation breakdown pressure associated with the simulated notch 304. In general, the spike in the kinetic energy during the fluid injection simulation may be identified by the observation of a kinetic energy value of much greater magnitude than the surrounding kinetic energy values. The kinetic energy spike also may generally occur as the pressure in the fluid injection simulation approaches the minimum confining stress plus rock tensile strength. For example, the measured kinetic energy in FIG. 6 experienced a large increase soon after pressure eclipsed 110 MegaPascals (MPa). 110 MPa could then be interpreted as the subsurface formation breakdown pressure for the fluid injection simulation. In the fluid injection simulation of FIG. 6, the minimum confining stress plus rock tensile strength was 100 MPa.

In embodiments, it is contemplated that the spike is a response of the subsurface formation near the tip of the notch 104, represented by the computational mesh 308 and the simulated notch 304, indicating one or more zones in the subsurface formation failed in tension, generating one or more hydraulic fractures. In embodiments, the fluid injection simulation may be configured to generate one or more hydraulic fractures at or near a tip of the simulated notch 304. The fluid injection simulation may generate the one or more hydraulic fractures in response to the spike in kinetic energy. The one or more hydraulic fractures may represent the one or more hydraulic fractures in the subsurface formation 108 that may have been created by hydraulic fracturing. The hydraulic fractures may be marked by the fluid injection simulation at the corresponding location in the computational mesh 308. In embodiments, the iterative process may further include allowing the fluid injection simulation to generate the one or more hydraulic fractures at the tip of the simulated notch 304. The iterative process may further include confirming the breakdown pressure by locating the one or more hydraulic fractures.

Still referring to FIGS. 3 and 6, and in embodiments, as the pressure in the fluid injection simulation approaches the minimum confining stress plus rock tensile strength, the spike in the monitored kinetic energy may be identified by a measured kinetic energy at least two times greater than the average measured kinetic energy in the fluid injection simulation. By way of non-limiting example, and as illustrated in FIG. 6, the spike in the monitored kinetic energy may be identified by a measured kinetic energy six times greater than the average measured kinetic energy in the fluid injection simulation. By way of another non-limiting example, and as also illustrated in FIG. 6, the spike in the monitored kinetic energy may also be identified as the pressure in the fluid injection simulation approaches the minimum confining stress plus rock tensile strength by a measured kinetic energy of at least 7 kJ. However, as will be recognized by one with ordinary skill in the art, the measured kinetic energy associated with the spike will vary depending on the distribution and severity of the confining stresses and mechanical rock properties of the subsurface formation represented by the computational mesh 308.

Referring again to FIGS. 1, 4A, 4B, and 4C, and as previously mentioned, the fluid injection simulation may generate a hydraulic fracture at a tip of the simulated notch 304. The hydraulic fracture may represent a hydraulically induced fracture in the subsurface formation 108. Also as previously mentioned, the target cutting depth may be measured orthogonally from the simulated wellbore 306. In embodiments, the minimum confining stress may act orthogonally to the target cutting depth. The maximum confining stress may act parallel to the target cutting depth.

Referring now to FIGS. 1, 2, and 4A, and as previously mentioned, the target wellbore 104 may be the horizontally drilled wellbore represented by the target wellbore 306. In embodiments, the minimum confining stress and maximum confining stress may be the minimum horizontal stress and the maximum horizontal stress, respectively. In these embodiments, the simulated notch may be a transverse simulated notch orientated about, or perpendicular to, the target wellbore 102's axis 118. The fluid injection simulation may also generate at least one transverse hydraulic fracture in the computational mesh 308 extending from the transverse simulated notch.

Referring now to FIGS. 1, 2, and 4C, and as previously mentioned, the target wellbore 104 may be the horizontally drilled wellbore represented by the simulated wellbore 306. In embodiments, the minimum confining stress and maximum confining stress may be the vertical confining stress and the minimum horizontal confining stress respectively. In these embodiments, the simulated notch may be a longitudinal simulated notch orientated along the target wellbore 102's axis 118. The fluid injection simulation may also generate at least one longitudinal hydraulic fracture in the computational mesh extending from the longitudinal simulated notch.

Referring now to FIGS. 1, 2, and 4B, and as previously mentioned, the target wellbore 104 may be the vertically drilled wellbore represented by the target wellbore 306. In embodiments, the minimum confining stress and maximum confining stress may be the vertical stress and the maximum horizontal stress respectively. In these embodiments, the simulated notch may be a transverse simulated notch orientated about, or perpendicular to, the target wellbore 102's axis 118. The fluid injection simulation may also generate at least one transverse hydraulic fracture in the computational mesh 308 extending from the transverse simulated notch.

Now referring to FIGS. 1, 4A, 4B, and 4C, and in embodiments, the fluid injection simulation may also generate hydraulic fractures for the directionally drilled wellbores previously mentioned. In these embodiments, as will be understood in the art, the minimum and maximum confining stresses of the subsurface formation 108 may be transformed using the wellbore inclination and azimuth to the minimum and maximum confining stresses acting on the target wellbore 102, represented by the simulated wellbore 306.

Still referring to FIGS. 1 and 4C, and in embodiments, the generation of the simulated notch 304 and the one or more hydraulic fractures may create a redistribution of the internal stresses in the computational mesh 308 around the hydraulic fractures. For example, FIG. 4C illustrates the computational mesh 308 after a fluid injection simulation has created two hydraulic fractures. As is meant to be shown by FIG. 4C, the creation of the hydraulic fractures has resulted in a concentration of stresses (shown by the diagonally lined portions) to the left and right of the simulated wellbore 306 and a reduction of stresses (shown by the shaded portions) to the top and bottom of the simulated wellbore 306, where the hydraulic fractures were formed. Referring again to FIGS. 1, 4A, 4B, and 4C, it is contemplated that the redistribution of internal stresses in the computational mesh 308 may correspond to a redistribution of stresses in the subsurface formation 108 after the subsurface formation 108 is hydraulically fractured.

Referring again to FIGS. 1 and 3, the wellbore modelling system 302 is configured to communicate the target notch shape, the target cutting depth, or both, to the notching tool 106 for notching the target wellbore 102 with the target notch shape, the target cutting depth, or both. In embodiments, the wellbore modelling system 302 may communicate the target notch shape to the notching tool 106. The notching tool 106 may also be configured to notch the target wellbore 102 with the target notch shape. The wellbore modelling system 302 may communicate the target cutting depth to the notching tool 106. The notching tool 106 may also be configured to notch the target wellbore 102 with the target cutting depth. The wellbore modelling system 302 may communicate both the target cutting depth and the target notch shape to the notching tool 106. The notching tool 106 may be configured to notch the target wellbore 102 with the target cutting depth and the target notch shape.

In embodiments, the wellbore modelling system 302 may be configured to communicate the target notch shape, the target cutting depth, or both, directly to the notching tool 106. For direct communication, it is contemplated that the wellbore modelling system 302 may include a two-way data communications link connecting communications hardware of the wellbore modelling system 302 to communications hardware of the notching tool 106.

In embodiments, the notching tool 106 may include a control unit (not shown). The control unit may include a processor communicatively coupled to a memory. The communications hardware of the notching tool 106 may receive the target notch shape, the target cutting depth, or both from the communications hardware of the wellbore modelling system 302 and transfer the target notch shape, the target cutting depth, or both to the memory of the control unit, to be stored in the memory. The processor may be configured to pull the target notch shape, the target cutting depth, or both from the memory. The processor may also be configured to configure the notching tool 106 to notch the target wellbore 102 and the subsurface formation with the target notch shape, the target cutting depth, or both pulled from the memory of the control unit when the notching tool 106 is activated.

Still referring to FIGS. 1 and 3, and in embodiments, the wellbore modelling system 302 may be configured to communicate the target notch shape, the target cutting depth, or both, indirectly to the notching tool 106. For indirect communication, it is contemplated that the wellbore modelling system 302 may include hardware for storing or displaying the target notch shape, the target cutting depth, or both, so that it may be transferred to the notching tool 106 or an operator of the notching tool 106. In embodiments, the operator of the notching tool 106 may use the target notch shape, the target cutting depth, or both to manually configure the notching tool 106 to produce the target notch shape, the target cutting depth, or both when the notching tool 106 is activated and notches the target wellbore 102 and subsurface formation.

Figure 5:
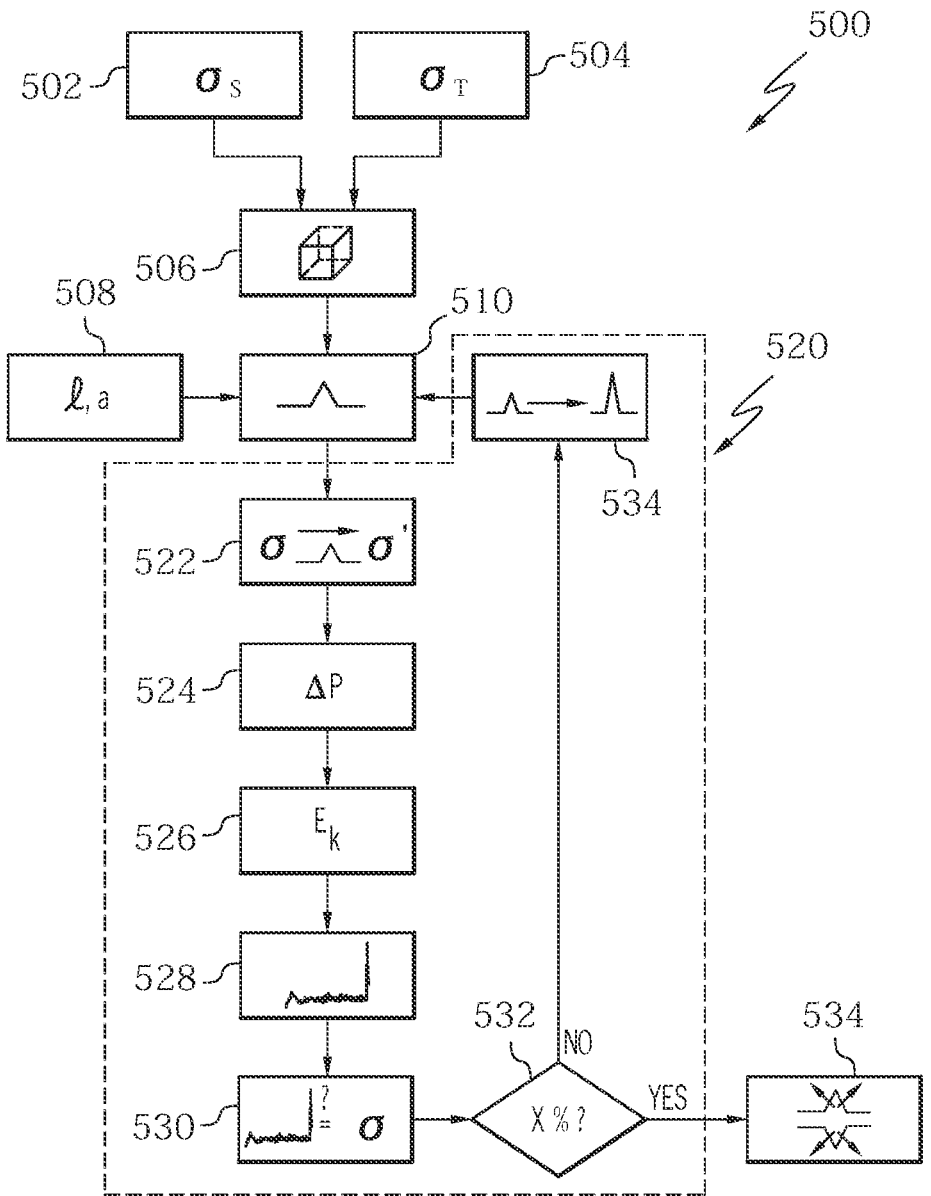
FIG. 5 is an illustration of a method for notching a target wellbore including the system according to one or more embodiments herein.

Now referring to FIG. 5, and in embodiments, an illustration of a method 500 for notching the target wellbore in the subsurface formation utilizing the notching tool and the wellbore modelling system in communication with the notching tool is illustrated.

Now referring to FIGS. 1-6, and in embodiments, the wellbore modelling system 302 may be any of the wellbore modelling systems previously described. The notching tool 106 may be any of the notching tools previously described. To create the wellbore modelling system 302, the method 500 may include the initial steps of determining subsurface formation stresses 502 and determining subsurface formation rock tensile strengths 504. In embodiments, step 502 may include determining global in-situ stresses and internal stresses. Step 504 may also include determining the mechanical rock properties. The computational mesh 308 may then be determined from step 502 and step 504's outputs (step 506). The method 500 may also include choosing simulated notch parameters (step 508), and then generating an initial simulated notch from the computational mesh 308 generated by step 506 and the initial simulated notch parameters of 508 (step 510). In embodiments, the simulated notch parameters may include the target cutting depth and the target notch shape.

Still referring to FIGS. 1-6, the method 500 then includes the step of executing an iterative process 520. In embodiments, the iterative process 520 may be any iterative process 520 previously described. The iterative process 520 may include the initial step 522 of determining a minimum confining stress of the computational mesh based on the global in-situ stresses and redistributing the internal stress distribution of the computational mesh based on a digital positioning of the simulated notch 304. A fluid injection simulation may then be generated for the computational mesh 308 including the simulated notch 304 and the simulated wellbore 306, the fluid injection simulation including a ramp-type pressure increase of wellbore pressure on a computational mesh-facing surface of the simulated wellbore 306 and the simulated notch 304 (step 524). A kinetic energy of the fluid injection simulation may then be monitored based on the ramp-type pressure increase (step 526). The iterative process 520 may then include predicting a breakdown pressure inside the computational mesh 308 by identifying the spike in the monitored kinetic energy in step 528.

In embodiments, the method 500 may then include calculating a difference of the breakdown pressure inside the computational mesh 308 and the minimum confining stress plus rock tensile strength in step 530. The iterative process 520 may then include a decision step 532, where the difference is compared to the target pressure delta. The target pressure delta may be any of the target pressure deltas previously described. In the decision step 532, if the difference is less than or equal to the target pressure delta, the method 500 progresses to step 536. If the difference is greater than the target pressure delta, an adjustment of the shape of the simulated notch 304, the cutting depth of the simulated notch 304, or both may then occur in step 534 to predict the adjusted breakdown pressure inside the computational mesh 308. In this scenario, the iterative process 520 may be continued from step 510 to step 532 to adjust breakdown pressure inside the computational mesh 308 until the difference is less than or equal to the target pressure delta and the method 500 progresses through step 534 to step 536.

Still referring to FIGS. 1-6 and in embodiments, step 536 of the method 500 may include identifying the target notch shape, the target cutting depth, or both associated with the iteratively adjusted breakdown pressure. The method 500 may then include communicating the target notch shape, the target cutting depth, or both, to the notching tool 106 in step 538. The method of communication may be any of the methods of communication previously described. The method 500 may then include notching the target wellbore 102 with the target notch shape, the target cutting depth, or both in step 540. In embodiments, step 540 may produce the notch 104 in the subsurface formation 108, as illustrated by FIG. 1. In embodiments, notching the target wellbore 102 may further include inserting the notching tool 106 into the target wellbore 102, translating or rotating the notching tool 106 within the target wellbore 102, and allowing the notching tool 106 to notch the target wellbore 102 and the subsurface formation.

The present application discloses several technical aspects. One aspect includes a system for notching a target wellbore in a subsurface formation, the system comprising a notching tool and a wellbore modelling system in communication with the notching tool, wherein: the wellbore modelling system comprises a simulated notch, a simulated wellbore, a computational mesh, and a data processor; the computational mesh comprises global in-situ stresses, an internal stress distribution and a rock tensile strength distribution that represents the subsurface formation; the simulated notch and the simulated wellbore are digitally positioned in the computational mesh of the wellbore modelling system; the simulated notch extends from the simulated wellbore; the data processor is communicatively coupled to the simulated notch, the simulated wellbore, and the computational mesh, and is operable to execute an iterative process comprising determining a minimum confining stress of the computational mesh based on the global in-situ stresses, redistributing the internal stress distribution of the computational mesh based on a digital positioning of the simulated notch, generating a fluid injection simulation for the computational mesh including the simulated notch and the simulated wellbore, the fluid injection simulation comprising a ramp-type pressure increase of wellbore pressure on a computational mesh-facing surface of the simulated wellbore and the simulated notch, the ramp-type pressure increase configured to model increasing wellbore pressure introduced by fluid injection in hydraulic fracturing, monitoring a kinetic energy of the fluid injection simulation based on the ramp-type pressure increase, predicting a breakdown pressure inside the computational mesh by identifying a spike in the monitored kinetic energy, adjusting a target notch shape of the simulated notch, a target cutting depth of the simulated notch, or both, to predict an adjusted breakdown pressure inside the computational mesh when a difference between the predicted breakdown pressure and the minimum confining stress plus the rock tensile strength is greater than a target pressure delta, continuing the iterative process to predict the adjusted breakdown pressure inside the computational mesh until the difference between the predicted breakdown pressure and the minimum confining stress plus the rock tensile strength is less than or equal to the target pressure delta, and identifying the target notch shape, the target cutting depth, or both, associated with the iteratively adjusted breakdown pressure; and the wellbore modelling system is configured to communicate the target notch shape, the target cutting depth, or both, to the notching tool for notching the target wellbore with the target notch shape, the target cutting depth, or both.

A second aspect may include the first aspect wherein the iterative process further comprises: allowing the fluid injection simulation to generate one or more hydraulic fractures at the tip of the simulated notch; and confirming the breakdown pressure by locating the one or more hydraulic fractures, wherein the fluid injection simulation is configured to create one or more hydraulic fractures in response to the spike in monitored kinetic energy and the hydraulic fractures represent one or more hydraulic fractures in the subsurface formation.

A third aspect may include the first or second aspects wherein the wellbore modelling system communicates the target notch shape to the notching tool; and the notching tool is configured to notch the target wellbore with the target notch shape.

A fourth aspect may include any one of the first through third aspects wherein the wellbore modelling system communicates the target cutting depth to the notching tool; and the notching tool is configured to notch the target wellbore with the target cutting depth.

A fifth aspect may include any one of the first through fourth aspects wherein the wellbore modelling system communicates the target cutting depth and the target notch shape to the notching tool; and the notching tool is configured to notch the target wellbore with the target cutting depth and the target notch shape.

A sixth aspect may include any one of the first through fifth aspects wherein, as the pressure in the fluid injection simulation approaches the minimum confining stress, the spike in the monitored kinetic energy is identified by a measured kinetic energy at least two times greater than the average measured kinetic energy in the fluid injection simulation.

A seventh aspect may include any one of the first through sixth aspects, wherein the target pressure delta represents an accepted optimization of the effect a current target cutting depth, a current notch shape, or both, have on the breakdown pressure approaching the minimum confining stress plus the rock tensile strength.

An eighth aspect may include any one of the first through seventh aspects, wherein the target pressure delta is less than five percent of the minimum confining stress plus the rock tensile strength.

A ninth aspect may include any one of the first through eighth aspects, wherein the target pressure delta is less than two percent of the minimum confining stress plus the rock tensile strength.

A tenth aspect may include any one of the first through ninth aspects, wherein the wellbore modelling system is configured to communicate the target notch shape, the target cutting depth, or both, directly or indirectly to the notching tool.

An eleventh aspect may include any one of the first through tenth aspects, wherein: the global in-situ stresses comprise two of a vertical stress, a maximum horizontal stress, and a minimum horizontal stress; the minimum confining stress is the lesser of the global in-situ stresses; and the maximum confining stress is the greater of the global in-situ stresses.

A twelfth aspect may include the eleventh aspect, wherein the simulated notch is digitally positioned orthogonally to the minimum confining stress and parallel to the maximum confining stress; the fluid injection simulation is configured to create one or more hydraulic fractures in response to the spike in monitored kinetic energy; and the one or more hydraulic fractures created by the fluid injection simulation represent one or more hydraulically induced fractures in the subsurface formation created as a result of hydraulic fracturing.

A thirteenth aspect may include the twelfth aspect wherein: the target wellbore is a horizontally drilled wellbore; the minimum confining stress is the minimum horizontal stress; the maximum confining stress is the maximum horizontal stress; the simulated notch is a transverse simulated notch orientated about the target wellbore's axis; and the fluid injection simulation generates at least one transverse hydraulic fracture in the computational mesh extending from the transverse simulated notch.

A fourteenth aspect may include the twelfth aspect wherein: the target wellbore is a vertically drilled wellbore; the minimum confining stress is the vertical stress; the maximum confining stress is the maximum horizontal stress; the simulated notch is a transverse simulated notch orientated about the target wellbore's axis; and the fluid injection simulation generates at least one transverse hydraulic fracture in the computational mesh extending from the transverse simulated notch.

A fifteenth aspect may include the twelfth aspect wherein: the target wellbore is a horizontally drilled wellbore; the minimum confining stress is the minimum horizontal stress; the maximum confining stress is the vertical stress; the simulated notch is a longitudinal simulated notch orientated along the target wellbore's axis; and the fluid injection simulation generates at least one longitudinal hydraulic fracture in the computational mesh extending from the longitudinal simulated notch.

A sixteenth aspect may include any one of the first through fifteenth aspects wherein the computational mesh further comprises mechanical rock properties comprising density, Young's modulus, Poisson's ratio, cohesion, friction angle, pore pressure, or combinations thereof.

A seventeenth aspect may include any one of the first through sixteenth aspects wherein: the wellbore modelling system is configured to communicate the target notch shape and the target cutting depth indirectly to the notching tool; the notching tool is configured to notch the target wellbore with the target cutting depth and the target notch shape; as the pressure in the fluid injection simulation approaches the minimum confining stress associated with the simulated notch, the spike in the monitored kinetic energy is identified by a measured kinetic energy at least two times greater than the average measured kinetic energy in the fluid injection simulation; and the target pressure delta is less than two percent of the minimum confining stress plus the rock tensile strength.

An eighteenth aspect may include any one of the first through seventeenth aspects and may also include a method for notching a target wellbore in a subsurface formation utilizing a notching tool and a wellbore modelling system in communication with the notching tool, wherein: the wellbore modelling system comprises a simulated notch, a simulated wellbore, a computational mesh, and a data processor; the computational mesh comprises global in-situ stresses, an internal stress distribution and a rock tensile strength distribution that represent the subsurface formation; the simulated notch and the simulated wellbore are digitally positioned in the computational mesh of the wellbore modelling system; the simulated notch extends from the simulated wellbore; the data processor is communicatively coupled to the simulated notch, the simulated wellbore, and the computational mesh; and the method comprises executing an iterative process comprising determining a minimum confining stress of the computational mesh based on the global in-situ stresses, redistributing the internal stress distribution of the computational mesh based on a digital positioning of the simulated notch, generating a fluid injection simulation for the computational mesh including the simulated notch and the simulated wellbore, the fluid injection simulation comprising a ramp-type pressure increase of wellbore pressure on a computational mesh-facing surface of the simulated wellbore and the simulated notch, monitoring a kinetic energy of the fluid injection simulation based on the ramp-type pressure increase, predicting a breakdown pressure inside the computational mesh by identifying a spike in the monitored kinetic energy, and adjusting a target notch shape of the simulated notch, a target cutting depth of the simulated notch, or both, to predict an adjusted breakdown pressure inside the computational mesh when a difference between the predicted breakdown pressure and the minimum confining stress plus the rock tensile strength is greater than a target pressure delta, continuing the iterative process to predict the adjusted breakdown pressure inside the computational mesh until the difference between the predicted breakdown pressure and the minimum confining stress plus the rock tensile strength is less than or equal to the target pressure delta, identifying the target notch shape, the target cutting depth, or both, associated with the iteratively adjusted breakdown pressure, communicating the target notch shape, the target cutting depth, or both, to the notching tool, and notching the target wellbore with the target notch shape, the target cutting depth, or both.

A nineteenth aspect may include the eighteenth aspect, wherein the method further comprises: inserting a notching tool into the target wellbore; translating or rotating the notching tool within the target wellbore; and allowing the notching tool to notch the target wellbore and the subsurface formation.

A twentieth aspect may include any previous aspect, and may also include a system for notching a target wellbore in a subsurface formation, the system comprising a notching tool and a wellbore modelling system in communication with the notching tool, wherein: the wellbore modelling system comprises a simulated notch, a simulated wellbore, a computational mesh, and a data processor; the simulated notch and the simulated wellbore are digitally positioned in the computational mesh of the wellbore modelling system; the data processor is communicatively coupled to the simulated notch, the simulated wellbore, and the computational mesh, and is operable to execute an iterative process comprising redistributing the internal stress distribution of the computational mesh based on the simulated notch, generating a fluid injection simulation for the computational mesh including the simulated notch and the simulated wellbore, predicting a breakdown pressure inside the computational mesh by identifying a spike in a monitored kinetic energy of the fluid injection simulation, adjusting a target notch shape of the simulated notch, a target cutting depth of the simulated notch, or both, to predict an adjusted breakdown pressure inside the computational mesh, continuing the iterative process to predict the adjusted breakdown pressure inside the computational mesh until the difference between the predicted breakdown pressure and a minimum confining stress of the confining stress distribution plus rock tensile strength is less than or equal to a target pressure delta, and identifying the target notch shape, the target cutting depth, or both, associated with the iteratively adjusted breakdown pressure; and the wellbore modelling system is configured to communicate the target notch shape, the target cutting depth, or both, to the notching tool for notching the target wellbore with the target notch shape, the target cutting depth, or both.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system for notching a target wellbore in a subsurface formation, the system comprising a notching tool and a wellbore modelling system in communication with the notching tool, wherein:

the wellbore modelling system comprises a simulated notch, a simulated wellbore, a computational mesh, and a data processor;

the computational mesh comprises global in-situ stresses, an internal stress distribution and a rock tensile strength distribution that represents the subsurface formation;

the simulated notch and the simulated wellbore are digitally positioned in the computational mesh of the wellbore modelling system;

the simulated notch extends from the simulated wellbore;

the data processor is communicatively coupled to the simulated notch, the simulated wellbore, and the computational mesh, and is operable to execute an iterative process comprising:

determining a minimum confining stress of the computational mesh based on the global in-situ stresses, redistributing the internal stress distribution of the computational mesh based on a digital positioning of the simulated notch, generating a fluid injection simulation for the computational mesh including the simulated notch and the simulated wellbore, the fluid injection simulation comprising a ramp-type pressure increase of wellbore pressure on a computational mesh-facing surface of the simulated wellbore and the simulated notch, the ramp-type pressure increase configured to model increasing wellbore pressure introduced by fluid injection in hydraulic fracturing, monitoring a kinetic energy of the fluid injection simulation based on the ramp-type pressure increase, predicting a breakdown pressure inside the computational mesh by identifying a spike in the monitored kinetic energy, adjusting a target notch shape of the simulated notch, a target cutting depth of the simulated notch, or both, to predict an adjusted breakdown pressure inside the computational mesh when a difference between the predicted breakdown pressure and the minimum confining stress plus the rock tensile strength is greater than a target pressure delta, continuing the iterative process to predict the adjusted breakdown pressure inside the computational mesh until the difference between the predicted breakdown pressure and the minimum confining stress plus the rock tensile strength is less than or equal to the target pressure delta, and identifying the target notch shape, the target cutting depth, or both, associated with the iteratively adjusted breakdown pressure; and the wellbore modelling system is configured to communicate the target notch shape, the target cutting depth, or both, to the notching tool; and the notching tool is configured to notch the target wellbore with the target notch shape based on the target notch shape received from the wellbore modelling system, with the target cutting depth based on the target cutting depth received from the wellbore modelling system, or both.

2. The system of claim 1, wherein the iterative process further comprises:

generating one or more hydraulic fractures at the tip of the simulated notch via the fluid injection simulation; and confirming the breakdown pressure by locating the one or more hydraulic fractures, wherein the fluid injection simulation is configured to create one or more hydraulic fractures in response to the spike in monitored kinetic energy and the hydraulic fractures represent one or more hydraulic fractures in the subsurface formation.

3. The system of claim 1, wherein:

the wellbore modelling system communicates the target notch shape to the notching tool; and the notching tool is configured to notch the target wellbore with the target notch shape based on the target notch shape received from the wellbore modelling system.

4. The system of claim 1, wherein:

the wellbore modelling system communicates the target cutting depth to the notching tool; and the notching tool is configured to notch the target wellbore with the target cutting depth based on the target cutting depth received from the wellbore modelling system.

5. The system of claim 1, wherein:

the wellbore modelling system communicates the target cutting depth and the target notch shape to the notching tool; and the notching tool is configured to notch the target wellbore with the target cutting depth and the target notch shape based on the target cutting depth and the target notch shape received from the wellbore modelling system.

6. The system of claim 1, wherein, as the pressure in the fluid injection simulation approaches the minimum confining stress, the spike in the monitored kinetic energy is identified by a measured kinetic energy at least two times greater than the average measured kinetic energy in the fluid injection simulation.

7. The system of claim 1, wherein the target pressure delta represents an accepted optimization of the effect a current target cutting depth, a current notch shape, or both, have on the breakdown pressure approaching the minimum confining stress plus the rock tensile strength.

8. The system of claim 1, wherein the target pressure delta is less than five percent of the minimum confining stress plus the rock tensile strength.

9. The system of claim 1, wherein the target pressure delta is less than two percent of the minimum confining stress plus the rock tensile strength.

10. The system of claim 1, wherein the wellbore modelling system is configured to communicate the target notch shape, the target cutting depth, or both, directly or indirectly to the notching tool.

11. The system of claim 1, wherein:

the global in-situ stresses comprise two of a vertical stress, a maximum horizontal stress, and a minimum horizontal stress;

the minimum confining stress is the lesser of the global in-situ stresses; and the maximum confining stress is the greater of the global in-situ stresses.

12. The system of claim 11, wherein the simulated notch is digitally positioned orthogonally to the minimum confining stress and parallel to the maximum confining stress;

the fluid injection simulation is configured to create one or more hydraulic fractures in response to the spike in monitored kinetic energy; and the one or more hydraulic fractures created by the fluid injection simulation represent one or more hydraulically induced fractures in the subsurface formation created as a result of hydraulic fracturing.

13. The system of claim 12, wherein:

the target wellbore is a horizontally drilled wellbore;

the minimum confining stress is the minimum horizontal stress;

the maximum confining stress is the maximum horizontal stress;

the simulated notch is a transverse simulated notch oriented about the target wellbore's axis; and the fluid injection simulation generates at least one transverse hydraulic fracture in the computational mesh extending from the transverse simulated notch.

14. The system of claim 12, wherein:

the target wellbore is a vertically drilled wellbore;

the minimum confining stress is the vertical stress;

the maximum confining stress is the maximum horizontal stress;

the simulated notch is a transverse simulated notch oriented about the target wellbore's axis; and the fluid injection simulation generates at least one transverse hydraulic fracture in the computational mesh extending from the transverse simulated notch.

15. The system of claim 12, wherein:

the target wellbore is a horizontally drilled wellbore;

the minimum confining stress is the minimum horizontal stress;

the maximum confining stress is the vertical stress;

the simulated notch is a longitudinal simulated notch orientated along the target wellbore's axis; and the fluid injection simulation generates at least one longitudinal hydraulic fracture in the computational mesh extending from the longitudinal simulated notch.

16. The system of claim 1, wherein the computational mesh further comprises mechanical rock properties comprising density, Young's modulus, Poisson's ratio, cohesion, friction angle, pore pressure, or combinations thereof.

17. The system of claim 1, wherein:

the wellbore modelling system is configured to communicate the target notch shape and the target cutting depth indirectly to the notching tool;

the notching tool is configured to notch the target wellbore with the target cutting depth and the target notch shape based on the target cutting depth and the target notch shape received from the wellbore modelling system;

as the pressure in the fluid injection simulation approaches the minimum confining stress associated with the simulated notch, the spike in the monitored kinetic energy is identified by a measured kinetic energy at least two times greater than the average measured kinetic energy in the fluid injection simulation; and the target pressure delta is less than two percent of the minimum confining stress plus the rock tensile strength.

18. A method for notching a target wellbore in a subsurface formation utilizing a notching tool and a wellbore modelling system in communication with the notching tool, wherein:

the wellbore modelling system comprises a simulated notch, a simulated wellbore, a computational mesh, and a data processor;

the computational mesh comprises global in-situ stresses, an internal stress distribution and a rock tensile strength distribution that represent the subsurface formation;

the simulated notch and the simulated wellbore are digitally positioned in the computational mesh of the wellbore modelling system;

the simulated notch extends from the simulated wellbore;

the data processor is communicatively coupled to the simulated notch, the simulated wellbore, and the computational mesh; and the method comprises executing an iterative process comprising:

determining a minimum confining stress of the computational mesh based on the global in-situ stresses, redistributing the internal stress distribution of the computational mesh based on a digital positioning of the simulated notch, generating a fluid injection simulation for the computational mesh including the simulated notch and the simulated wellbore, the fluid injection simulation comprising a ramp-type pressure increase of wellbore pressure on a computational mesh-facing surface of the simulated wellbore and the simulated notch, monitoring a kinetic energy of the fluid injection simulation based on the ramp-type pressure increase, predicting a breakdown pressure inside the computational mesh by identifying a spike in the monitored kinetic energy, and adjusting a target notch shape of the simulated notch, a target cutting depth of the simulated notch, or both, to predict an adjusted breakdown pressure inside the computational mesh when a difference between the predicted breakdown pressure and the minimum confining stress plus the rock tensile strength is greater than a target pressure delta, continuing the iterative process to predict the adjusted breakdown pressure inside the computational mesh until the difference between the predicted breakdown pressure and the minimum confining stress plus the rock tensile strength is less than or equal to the target pressure delta, identifying the target notch shape, the target cutting depth, or both, associated with the iteratively adjusted breakdown pressure, communicating the target notch shape, the target cutting depth, or both, to the notching tool with the wellbore modelling system, and notching the target wellbore with the notching tool with the target notch shape based on the target notch shape received from the wellbore modelling system, with the target cutting depth based on the target cutting depth received from the wellbore modelling system, or both.

19. The method of claim 18, wherein the method further comprises:

inserting a notching tool into the target wellbore;

translating or rotating the notching tool within the target wellbore; and notching the target wellbore and the subsurface formation with the notching tool.

20. A system for notching a target wellbore in a subsurface formation, the system comprising a notching tool and a wellbore modelling system in communication with the notching tool, wherein:

the wellbore modelling system comprises a simulated notch, a simulated wellbore, a computational mesh, and a data processor;

the simulated notch and the simulated wellbore are digitally positioned in the computational mesh of the wellbore modelling system;

the data processor is communicatively coupled to the simulated notch, the simulated wellbore, and the computational mesh, and is operable to execute an iterative process comprising redistributing the internal stress distribution of the computational mesh based on the simulated notch, generating a fluid injection simulation for the computational mesh including the simulated notch and the simulated wellbore, predicting a breakdown pressure inside the computational mesh by identifying a spike in a monitored kinetic energy of the fluid injection simulation, adjusting a target notch shape of the simulated notch, a target cutting depth of the simulated notch, or both, to predict an adjusted breakdown pressure inside the computational mesh, continuing the iterative process to predict the adjusted breakdown pressure inside the computational mesh until the difference between the predicted breakdown pressure and a minimum confining stress of the confining stress distribution plus rock tensile strength is less than or equal to a target pressure delta, and identifying the target notch shape, the target cutting depth, or both, associated with the iteratively adjusted breakdown pressure; and the wellbore modelling system is configured to communicate the target notch shape, the target cutting depth, or both, to the notching tool; and the notching tool is configured to notch the target wellbore based on the target notch shape, the target cutting depth, or both received from the wellbore modelling system.

\* \* \* \* \*